US010760420B2

(12) United States Patent
Ianni (10) Patent No.: US 10,760,420 B2
(45) Date of Patent: Sep. 1, 2020

(54) UNDERGROUND VENTILATION APPARATUS AND METHOD (71) Applicant: POLYVENT PTY LTD, Sydney, NSW (AU)

(72) Inventor: Joseph Ianni, Mount Warrigal (AU)

(73) Assignee: Polyvent PTY LTD, Sydney (AU)

( * ) Notice: Subject to any disclaimer, the term of this patent is extended or adjusted under 35 U.S.C. 154(b) by 181 days.

(21) Appl. No.: 15/544,844

(22) PCT Filed: Jan. 22, 2016

(86) PCT No.: PCT/AU2016/050033
§ 371 (c)(1),
(2) Date: Jul. 19, 2017

(87) PCT Pub. No.: WO2016/115605
PCT Pub. Date: Jul. 28, 2016

(65) Prior Publication Data
US 2017/0362937 A1 Dec. 21, 2017

(30) Foreign Application Priority Data
Jan. 23, 2015 (AU) .................................. 2015900200

(51) Int. Cl.
*F16L 9/22* (2006.01)
*F16L 21/06* (2006.01)
(Continued)

(52) U.S. Cl.
CPC ................ *E21F 1/06* (2013.01); *E21F 1/006* (2013.01); *F16L 9/22* (2013.01); *E21F 1/04* (2013.01);
(Continued)

(58) Field of Classification Search
CPC . F16L 9/22; F16L 21/06; F16L 21/065; F16L 17/04; F16L 27/1133; F16L 11/18; E21F 1/06; E21F 1/006
(Continued)

(56) References Cited

U.S. PATENT DOCUMENTS 1,025,186 A     5/1912   Hill
1,052,198 A  *  2/1913   Wyre ...................... F16L 9/003
                                                                285/419
(Continued)

FOREIGN PATENT DOCUMENTS

CN         2207446 Y      9/1995
CN       201433783 Y      3/2010
(Continued)

OTHER PUBLICATIONS

International Search Report dated Mar. 1, 2016 from International Patent Application No. PCT/AU2016/050033 filed Jan. 22, 2016.
(Continued)

*Primary Examiner* — Zachary T Dragicevich
*Assistant Examiner* — William S. Choi
(74) *Attorney, Agent, or Firm* — David B. Tingey; Bryant J. Keller; Kirton McConkie (57) ABSTRACT

A ventilation apparatus includes a plurality of tubular conduit sections, each conduit section including a first semi-tubular section and a second semi-tubular section, each semi-tubular section having a cross-sectional profile generally in the form of an open semi-circular annular element, when viewed along a longitudinal axis. Each tubular conduit includes a first engagement formation located at an end of the tubular conduit, and a second engagement formation located at an opposing end of the tubular conduit.

8 Claims, 6 Drawing Sheets

(51) Int. Cl.
   *F16L 17/04*    (2006.01)
   *E21F 1/06*     (2006.01)
   *E21F 1/00*     (2006.01)
   *E21F 1/04*     (2006.01)

(52) U.S. Cl.
   CPC .............. *F16L 17/04* (2013.01); *F16L 21/06* (2013.01); *Y10T 29/49826* (2015.01)

(58) Field of Classification Search
   USPC .................................................. 285/419, 373
   See application file for complete search history.

(56) References Cited

U.S. PATENT DOCUMENTS

| 1,649,752 | A | * | 11/1927 | Stone | F16L 21/06 |
| | | | | | 285/419 |
| 1,948,232 | A | | 8/1931 | Hall | |
| 4,318,518 | A | * | 3/1982 | Davis | E21F 17/02 |
| | | | | | 248/60 |
| 4,358,139 | A | | 11/1982 | Hoy | |
| 5,197,767 | A | * | 3/1993 | Kimura | F16G 13/10 |
| | | | | | 138/120 |
| 2005/0109415 | A1 | | 5/2005 | Snyder | |
| 2014/0069546 | A1 | * | 3/2014 | McNab | F16L 57/04 |
| | | | | | 138/140 |

FOREIGN PATENT DOCUMENTS

| FR | 2676785 A1 | * | 11/1992 | ............ F16L 9/22 |
| GB | 784158 A | | 10/1957 | |
| GB | 2012901 A | | 8/1979 | |
| GB | 2162278 A | | 1/1986 | |
| GB | 2162279 A | | 1/1986 | |
| JP | H1151258 A | | 2/1999 | |

OTHER PUBLICATIONS

International Preliminary Report on Patentability and Annexes dated May 12, 2017 from International Patent Application No. PCT/AU2016/050033 filed Jan. 22, 2016.

\* cited by examiner

UNDERGROUND VENTILATION APPARATUS AND METHOD

CROSS REFERENCE TO RELATED APPLICATION(S)

This application is a U.S. National Stage Entry of International Patent Application No. PCT/AU2016/050033, filed Jan. 22, 2016, which claims the benefit of Australian Patent Application No. 2015900200, filed Jan. 23, 2015, the disclosures of which are hereby incorporated entirely herein by reference.

TECHNICAL FIELD

The present disclosure relates to an underground ventilation apparatus and method. In particular, the present invention relates to a ventilation apparatus and method for use in mining applications, and in particular, in coal mining applications.

BACKGROUND OF THE INVENTION

Coal mining is generally performed utilising either an open cut or alternatively an underground mining method. When coal mining is conducted underground, it is essential that there is sufficient ventilation within the mine for workers. This requires the provision of fresh air from outside, in addition to the removal of potentially harmful waste gasses generated within the mine.

Ventilating remote locations within an underground mine can be particularly difficult to achieve. It is necessary to install and maintain a ventilation circuit including an intake and a separate return airway to the innermost location to be ventilated. Ventilation tubing is typically installed as the mine is cut by a continuous miner, after the roadway has been excavated and the roof supported, prior to further advancement of the continuous miner.

As the roadway and the cutting face advance underground, the final portion of the roadway in front of the continuous miner defines an air flow impasse, which creates a stagnant area, having limited air flow and ventilation. This occurs because the air flow circuit is closed in this region of the mine. This makes it difficult to ventilate at or near the cutting face, where the continuous miner, and any workers operating the continuous miner, are located.

The cutting face is generally ventilated using an auxiliary fan which has ventilation tubes connected to it. The ventilation tubes run from the fan (which is positioned in the return airway) and the tubes are suspended from the roof of the mine, and extend all the way to the cutting face. The fan is used to draw air away from the cutting face, which in turn creates a low air pressure at the cutting face. This results in fresh air from the fresh air supply line being drawn toward the face and also displacing airborne dust and gases away from the area.

As the continuous miner cuts the coal, the cutting face progresses forward and the roof of the roadway is supported using bolts or other support techniques. The continuous miner includes a flexible trunk that is connected to the end of the ventilation tube which is located closest to the cutting face. The flexible trunk is approximately 8-10 metres long. Accordingly, after 8-10 metres of mining, the process of hanging another two ventilation tubes is conducted.

This process requires that the continuous miner is turned off and isolated. It is then necessary to bring in a vehicle such as a diesel vehicle with a man basket on the front and two additional vent tubes located in the man basket.

Typically, the process requires that the diesel vehicle drives behind the continuous miner, two workers get into the man basket and are lifted up to the height of the flexible trunk. The workers then pull the rest of the flexible trunk out of the existing vent tubes and proceed to hang the new ventilation tubes that have been supplied by the basket. After this process is completed, the workers reinstall the flexible trunk to the end of the new ventilation tubes to reinstate ventilation to the cutting face.

The process described above suffers from several inherent drawbacks. Firstly, the removal of the flexible trunk from the last vent tube results in loss of ventilation to the cutting face. This problem is compounded by the fact that the diesel vehicle is typically emitting $CO_2$ gases into the restricted ventilation cutting face area. If the emissions of $CO_2$ or CO or other dangerous gasses reach an elevated predetermined level, this will cause the gas sensors on the continuous miner to trip the power therefore not allowing the miner to continue mining until a statutory official has inspected the area, degased the area and notified the undermanager on shift. Power is then re-established to the continuous miner once gas levels are back within safe mining levels.

Existing ventilation tubes are typically stored within the mine prior to and after use, typically in a cut-through formation, where they are stacked side by side and on top of each other. The large volume of space required prevents the cut-through (or other storage location within the mine) from being utilised for storing other mining equipment.

The existing ventilation tubes are heavy, which creates various manual handling risks when the tubes are being installed, decommissioned or otherwise moved.

A further problem with the existing ventilation system described above concerns downtime in production on account of the time required to install the ventilation tubes which can take from 25-35 minutes to complete and on average needs to be done three times per shift.

A further disadvantage with existing underground ventilation systems concerns the retrieval of the vent tubes. This process typically requires six men and two Jug-A-O machines to reclaim vent tubes for a single panel advance (the block of coal being mined). This process on average usually takes half a shift, and may be necessary once a month. Three men are occupied by the Jug-A-O with the man basket being used to remove the tubes from the roof and drop them down to the floor where another worker loads the tubes that have been dropped onto a second Jug-A-O that is used to take the tubes to a storage area. The operator of the Jug-A-O that is taking the tubes to the storage area is then met by another worker that is waiting to stack the tubes for storage. Disadvantageously, this process is labour intensive, and requires significant amounts of manual handling and lifting of heavy vent tubes.

Typically each vent tube must be manually handled six times from hanging on the roof to the placement in the storage area. Given that approximately 100 vent tubes typically need to be moved for a single panel advance, the amount of man handling is significant.

OBJECT OF THE INVENTION

It is an object of the present invention to substantially overcome or at least ameliorate one or more of the above disadvantages, or to provide a useful alternative.

SUMMARY

In a first aspect, the present invention provides a ventilation apparatus comprising:

a plurality of tubular conduit sections, each conduit section including;
a first semi-tubular section and a second semi-tubular section, each semi-tubular section having a cross-sectional profile generally in the form of an open semi-circular annular element, when viewed along a longitudinal axis;
wherein each tubular conduit includes a first engagement formation located at a longitudinal end of the tubular conduit, and a second engagement formation located at an opposing longitudinal end of the tubular conduit;
wherein the first engagement formation is defined by a flared female end portion;
further wherein the flared female end portion is adapted to receive the second engagement portion defined by a male projection;
further wherein each of the first semi-tubular section and the second semi-tubular section includes one or more circumferentially extending stiffening bands.

Each of the first and second semi-tubular sections preferably includes a third engagement formation and a corresponding fourth engagement formation.

The third engagement formation preferably includes a longitudinally extending rib, and the fourth engagement formation includes a corresponding longitudinally extending groove.

The groove preferably includes at least one outwardly tapering lip, the lip providing a lateral guide surface which assists when bringing two of the semi-tubular sections into abutment.

The longitudinally extending rib preferably includes a cut-out and the longitudinally extending groove includes a corresponding tooth, the tooth and cut-out being adapted to interact to longitudinally align the first semi-tubular section and the second semi-tubular section.

The first and a second semi-tubular sections are preferably held in abutment with each other using one or more straps.

The conduit sections are preferably fabricated from fire resistant anti-static polyethylene or polycarbonate.

The first semi-tubular section and the second semi-tubular section each preferably include one or more hooks for securing the tubular conduit sections to a roof or wall structure.

The ventilation apparatus further preferably comprises one or more connector pieces adapted to secure two adjacent tubular conduit sections, such that longitudinal axes of the tubular conduit sections are non-linear.

The connector pieces preferably enable the tubular conduit sections to be connected at an angular offset of 90 degrees or 45 degrees.

Each of the first semi-tubular section and a second semi-tubular section preferably includes one or more first radially extending stiffening bands.

Each stiffening band preferably includes two notches, each notch being adapted to receive an opposing longitudinal edge of a corresponding semi-tubular section for stacking.

In a second aspect, the present invention provides a method of installing a ventilation apparatus, the method including the following steps:
securing a first semi-tubular section to a support structure,
securing a second semi-tubular section to the first semi-tubular section to define a tubular conduit section, the tubular conduit section having a first engagement formation located at a first end, and a second engagement formation located at an opposing second end wherein the first engagement formation is defined by a flared female end portion, the flared female end portion is adapted to receive the second engagement portion defined by a male projection; and
installing one or more additional tubular conduit sections such that the first engagement formation of each tubular conduit section engages with the second engagement formation of an adjacent tubular conduit section.

Preferably the step of securing a second semi-tubular section to the first semi-tubular section includes encircling both the first and second semi-tubular sections with one or more straps, and tightening the strap(s) until the first and second semi-tubular sections are drawn into abutment.

Each of the first and second semi-tubular sections preferably has two longitudinally extending generally parallel edges, one of the edges having a third engagement formation defined by a longitudinally extending rib, the other edge having a fourth engagement formation defined by a longitudinally extending groove, wherein the step of securing a second semi-tubular section to the first semi-tubular section includes engaging the respective third engagement formations of the first semi-tubular section with the fourth engagement formation of the second semi-tubular section.

BRIEF DESCRIPTION OF THE DRAWINGS

A preferred embodiment of the invention will now be described by way of specific example with reference to the accompanying drawings, in which.

DETAILED DESCRIPTION OF THE PREFERRED EMBODIMENTS

An underground ventilation apparatus 10 and ventilation method are described herein. The ventilation apparatus 10 includes a plurality of tubular pipe or conduit sections 20 manufactured from a fire resistant anti-static polyethylene, polycarbonate or another suitable engineering polymer or material.

In the preferred embodiment described herein, each conduit section 20 is formed by two semi-tubular sections 30a, 30b. Each semi-tubular section 30a, 30b has a cross-sectional profile generally in the form of an open, semi-circular annular element, when viewed along a longitudinal axis XX, extending radially around 180°. However, it will be appreciated by those skilled in the art that more than two sections may define the conduit section 20. For example, three sections each extending radially around 120°.

In one embodiment, each semi-tubular section 30a, 30b is separately manufactured, for example in an injection moulding process. In an alternative embodiment, the semi-tubular section 30a, 30b are obtained by taking existing ventilation tubing, and cutting the conduit sections in half, and subsequently retrofitting seals, as will be described in detail below. This enables existing ventilation systems to be retrofitted in accordance with the apparatus 10.

Each tube section 30a, 30b when manufactured separately provides significant advantages for transportation, as less space is required to transport a given number of tube sections 30a, 30b. This provides cost saving advantages, for example during shipping and trucking, as the nested tube sections 30a, 30b occupy significantly less space than complete tubes. Once the tubes arrive at their end location, typically a mine, they may be permanently assembled into conduit sections 20, and kept in that configuration. Alternatively the mine may disassemble the tube sections 30a, 30b when not in use.

Figure 3:
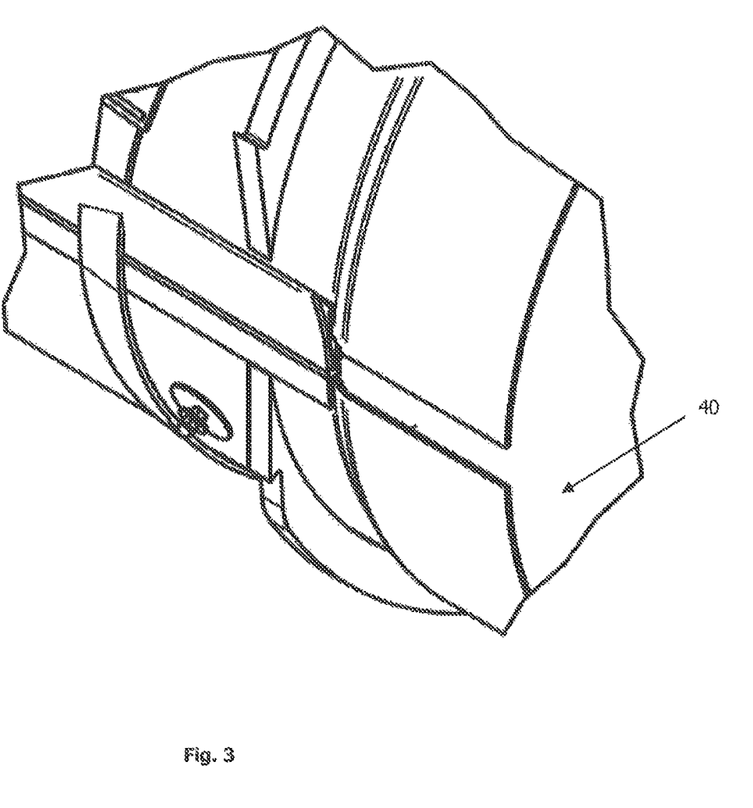
FIG. 3 is a further detail depicting a portion of the underground ventilation apparatus of FIG. 1.

Each conduit section 20 has a first, female engagement formation 40 defined by a flared end portion of the conduit section 20, having an increased diameter. A portion of the female engagement formation 40 is depicted in FIG. 3.

Figure 1:
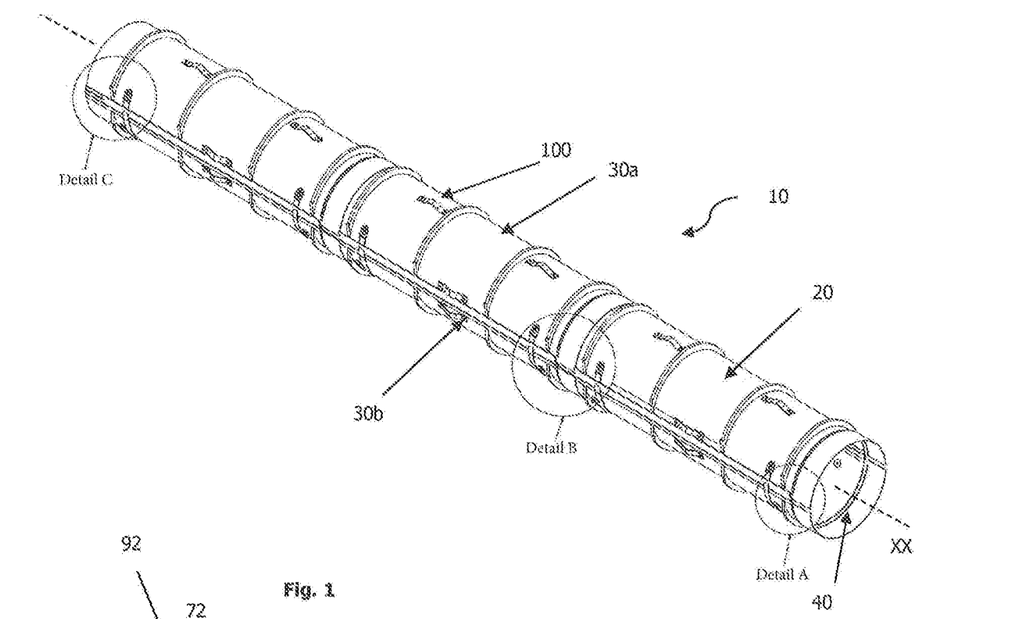
FIG. 1 is a perspective view depicting a plurality of interconnected conduit sections of the underground ventilation apparatus of the invention.

Each conduit section 20 has an opposing, second, male engagement formation 42 defined by an end 42 of the conduit section 20. The first engagement formation 40 and the second engagement formation 42 are located at opposing ends of the conduit section 20. As depicted in FIG. 1, there are three interconnected conduit sections 20. However, there is no limit to how many conduit sections 20 may be interconnected.

Accordingly, each conduit section 20 is adapted to selectively engage with an adjacent, like conduit section 20.

The two semi-tubular sections 30a, 30b which define each conduit section 20 engage with each other along the two longitudinally extending parallel edges by means of a third engagement formation 50 defined by a longitudinally extending rib 52, and a fourth engagement formation 60 defined by a longitudinally extending slot or groove 54.

The rib 52 and the groove 54 may be integrally formed with each semi-tubular section 30a, 30b during manufacture. Alternatively, the rib 52 and the groove 54 may be defined by a first, separately formed sealing profile 56 containing the groove 54 (best seen in FIG. 4) and a second, separately formed sealing profile 58 containing the rib 52 (best seen in FIG. 5).

Figure 4:
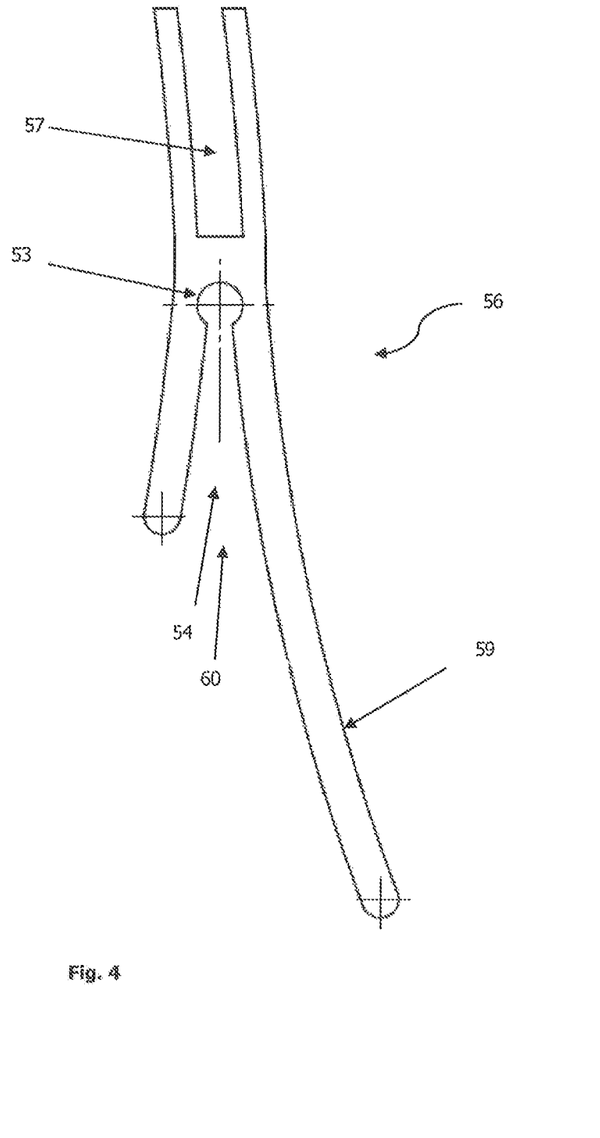
FIG. 4 shows a female seal profile of the underground ventilation apparatus of FIG. 1.

Referring to FIG. 4, sealing profile 56 includes a longitudinally extending channel 57. This channel 57 is intended to be seated on one of the longitudinally extending edges of each semi-tubular sections 30a, 30b. The sealing profile 56 may be secured to the semi-tubular section 30a, 30b with a suitable adhesive, such as urethane. Additional fasteners, such as stainless steel bolts may also be used.

Again referring to FIG. 4, the groove 54 is flared or outwardly tapering, such that the extension lip 59 is located along the radially outer surface of the semi-tubular sections 30a, 30b. This is shown for example on the rights side of FIG. 7. The extension lip provides a guide surface which assists when bringing two of the semi-tubular sections 30a, 30b into abutment. Advantageously, this reduces the required level of lateral alignment, as the extension lip 59 can accommodate some degree of lateral misalignment.

The circular void 53 formed at the base of the groove 54 provides increased material flexibility between the two arms which define the groove 54.

Figure 5:
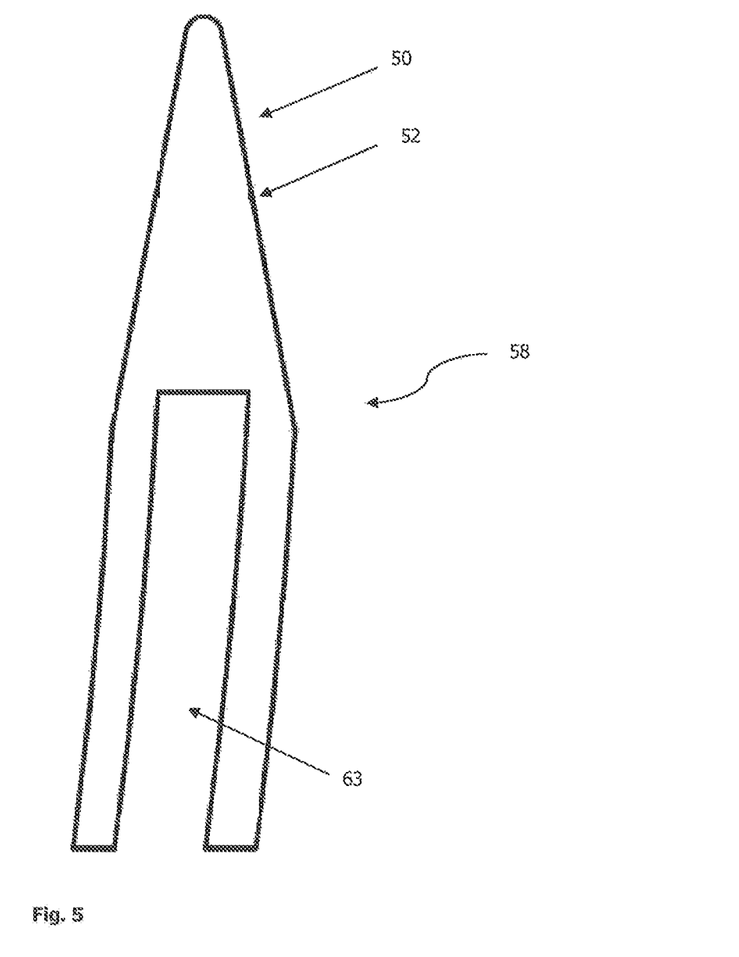
FIG. 5 shows a male seal profile of the underground ventilation apparatus of FIG. 1.

Referring to FIG. 5, the second sealing profile 58 includes a channel 63 which is seated on one of the longitudinally extending edges of each semi-tubular sections 30a, 30b. The sealing profile 58 may be secured to the semi-tubular section 30a, 30b with a suitable adhesive, such as urethane. Additional fasteners, such as stainless steel bolts may also be used.

Each semi-tubular section 30a, 30b includes one of the first sealing profiles 56 and one of the second sealing profiles 58.

Again referring to FIG. 5, the rib 52 is defined by a tapering projection. The reduced cross-sectional area of the rib 52 toward the tip also assists in guiding the rib 52 into the groove 54.

Figure 2:
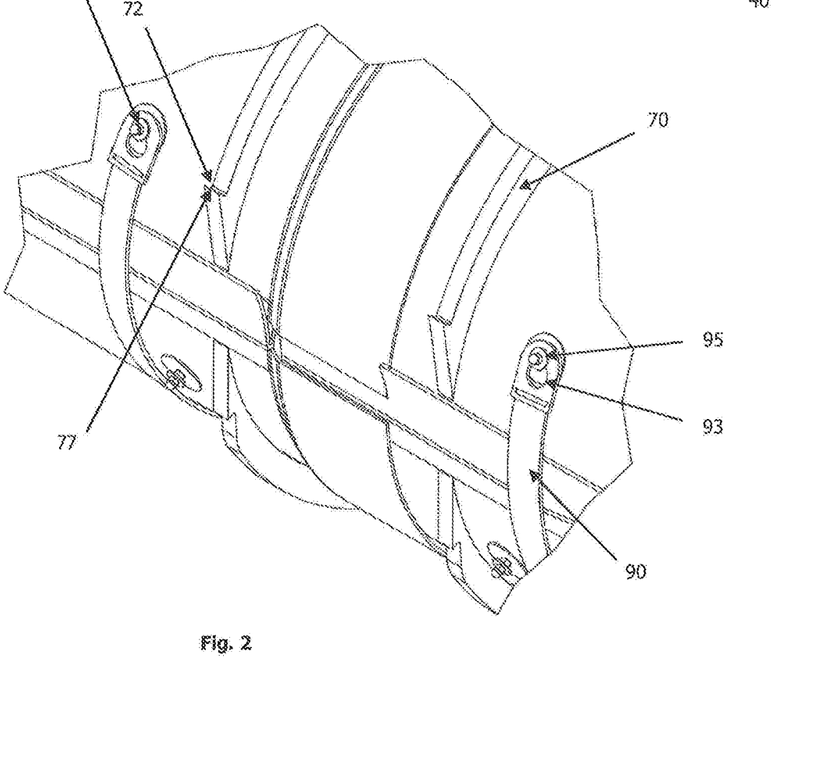
FIG. 2 is a detail depicting a portion of the underground ventilation apparatus of FIG. 1.

FIG. 2 is a partial perspective view showing the overlap region between two adjacent conduit sections 20. In that detail, the interaction between the third engagement formation 50 and the fourth engagement formation 60 can be clearly seen. The interaction between the third engagement formation 50 and the fourth engagement formation 60 serves the purpose of improving the seal between the semi-tubular sections 30a, 30b. In addition, it assists in locating the semi-tubular section 30a, 30b in the correct orientation relative to each other.

Figure 6:
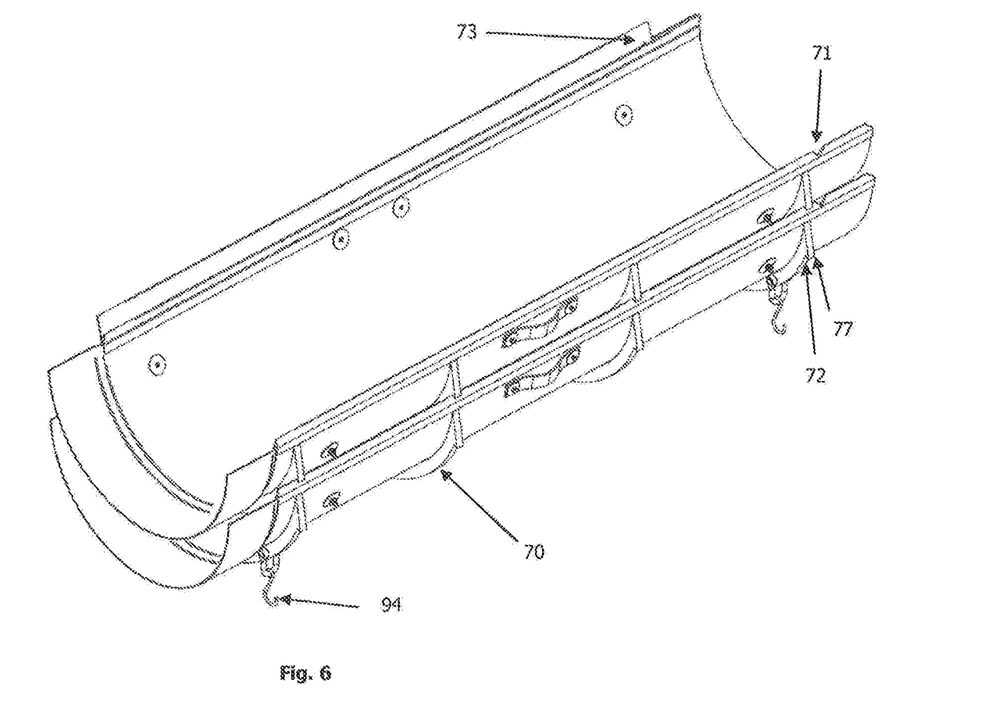
FIG. 6 is perspective view depicting two units of the underground ventilation apparatus in a stacked configuration.

As shown in FIGS. 2 and 6, each conduit section 20 includes a plurality of radially extending stiffening bands 70. In one embodiment, a plurality of longitudinally extending stiffening ribs may also be included. The stiffening bands 70 provide improved strength and rigidity, whilst keeping the weight of each conduit section 20 to a minimum. As such, a single worker can generally lift and handle one of the semi-tubular sections 30a, 30b unassisted.

The stiffening bands 70 may be integrally formed with the semi-tubular sections 30a, 30b during manufacture. Alternatively, the semi-tubular section 30a, 30b may be secured to the semi-tubular section 30a, 30b after manufacture. The securement may be achieved with adhesives, plastic welding or using suitable fasteners. The post-manufacture installation of the stiffening bands 70 is particularly useful when retrofitting the invention to existing ventilation tubing.

Referring to FIG. 6, each rib 52 preferably includes a cut-out 71. In the embodiment depicted in the drawings, the cut-out is generally triangular, although it will be appreciated that the cut-out 71 may be provided in other shapes. The cut-out 71 interacts with a corresponding tooth 73 which is also triangular and formed within the groove 54. The interaction between the cut-out 71 and the tooth 73 defines a means of correctly locating longitudinally the two semi-tubular section 30a, 30b relative to each other. The tapering nature of the tooth 73 serves to pulling the semi-tubular sections 30a, 30b into axial alignment if they are sufficiently closely aligned.

Figure 7:
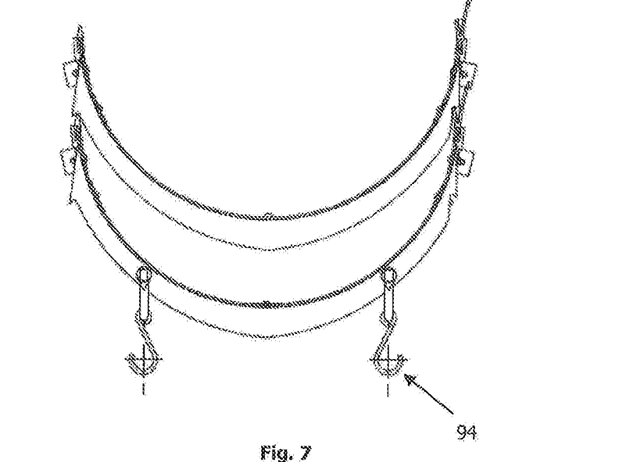
FIG. 7 is an end view depicting the stacked units of FIG. 6.
Figure 8:
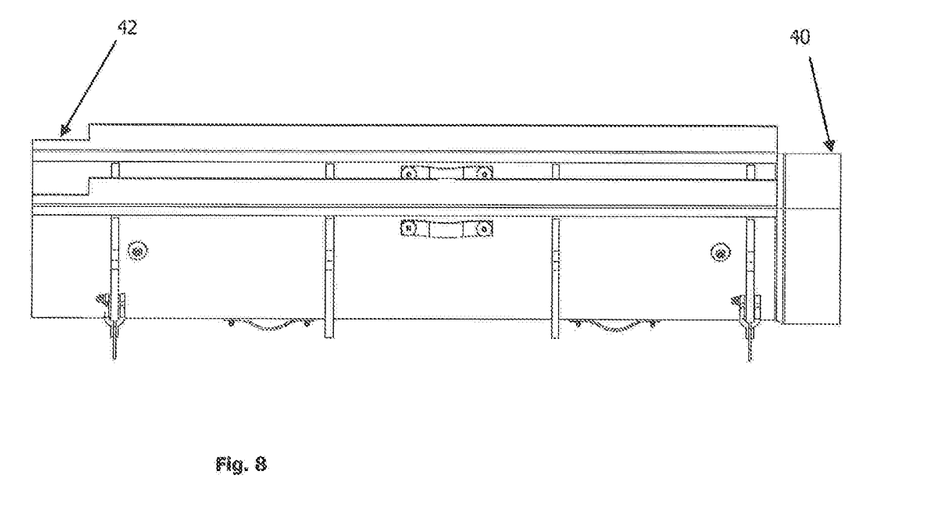
FIG. 8 is a side view depicting the stacked units of FIG. 6.

Referring to FIG. 2, each stiffening band 70 includes a notch or cut-out 72, which defines a lug 77. The lugs 77 provide stacking support when the semi-tubular sections 30a, 30b are nested in a vertical stack. This stacking arrangement is depicted in FIGS. 6 to 8, and applies during storage or transportation conditions.

Each pair of semi-tubular sections 30a, 30b is secured to each other with a plurality of cables or straps 90, best seen in FIG. 2. The straps 90 may be fixed length straps, with just enough length to engage with a fastener 92 formed on an outer wall of the semi-tubular sections 30a, 30b. Alternatively, the straps 90 may be retractable ratchet straps, which enable a varied amount of force and tensioning to be applied. In the embodiment depicted, the straps 90 have eyelets 93 which engage with pins 95, each pin having a flared head. The pins 95 are mounted on washers which distribute the strap load.

Each semi-tubular section 30a, 30b preferably includes a number of hooks 94, specifically intended for being supported from the rib or roof of the mine, for example by hanging them from a steel mesh which is installed to the strata support bolts. The hooks are depicted in FIG. 7.

Eyelets or handles 100 may be secured to each conduit section 20 for supporting the conduit section 20 from the roof, and for personnel to handle.

The diameter and length of each conduit section 20 can be custom made to achieve the requisite level of ventilation for a given mining application. However, it is envisaged that the typical length is around 2 metres, and diameter will be approximately 600 mm.

The ventilation apparatus 10 includes angled connector pieces (not shown) for enabling the interconnection of non-linear conduit sections 20. For example, this enables the ventilation line to run at different angles and configurations, depending on the layout and gradient of the roadway in the mine. The connector pieces may include but are not limited to 90-degree elbows, 45-degree elbows, T pieces and degassing tubes. The connector pieces may each be manufactured as single annular fittings. Alternatively, they may be manufactured in halves, in a similar manner to each semi-tubular sections 30a, 30b. Each connector piece generally includes a male end, and a female end, in a similar manner to each conduit section 20. The connector pieces may be angularly adjustable, for example with a flexible bellows type section.

The conduit sections 20 can be nested and stacked when not in use. This provides a significant improvement on the existing ventilation pipes which in contrast require a considerable volume of space to store, and which need to be stored and supported carefully to prevent them from rolling.

The installation of the ventilation apparatus 10 will now be described. Each semi-tubular section 30a, 30b can generally be installed by a single worker. This eliminates the need to purposely deploy a diesel vehicle to the cutting face area to supply vent tubes. As the mining machine is mining and progressing the cutting face forward, the worker can retrieve one of the semi-tubular sections 30a, 30b and carry it up onto the platform of the mining machine, and hang it from the roof, to create an upper half of the conduit section 20. As the mining machine advances forward, the flexible trunk will be pulled out below the semi-tubular section 30a that has already been suspended from the roof. The lower semi-tubular section 30b can then be attached from below, using the straps to create a fully enclosed conduit section 20 with no or minimal downtime and no loss of ventilation to the coalface at any time. The flexible trunk is secured to the conduit section 20 on account of the suction force generated by the auxiliary ventilation fan.

Advantageously, only two workers are generally required during reclaiming of the vent tubes. That is, one worker to drive the diesel vehicle, and a second worker located in the man basket. The worker in the man basket removes the lower semi-tubular section 30b first, stacks it upright then removes the upper semi-tubular section 30a. The semi-tubular sections 30a, 30b can be nested with each other, minimising the amount of storage area occupied by the semi-tubular sections 30a, 30b in the man basket. Approximately twenty conduit sections 20 can be removed and stored comfortably in one man basket. The conduit sections 20 that have been reclaimed can be taken to the storage area by the same machine and man basket that had reclaimed them. The above described process is significantly faster, and only requires two workers. The tubes will be handled twice not six times minimizing manual handling injuries.

Advantageously, the ventilation apparatus 10 reduces the amount of interaction between workers and machinery, by negating the need to have two workers in man basket during assembly of the ventilation ducting.

Advantageously, the semi-tubular sections 30a, 30b when stacked and nested occupy approximately 20% of the storage space that would be required for a similar length of existing ventilation tubes. This provides advantages during storage above ground, storage within the mine, and transportation.

Although the invention has been described with reference to specific examples, it will be appreciated by those skilled in the art that the invention may be embodied in many other forms.

The claims defining the invention are as follows:

1. A ventilation apparatus comprising:
   a plurality of tubular conduit sections, each conduit section including:
   a first semi-tubular section and a second semi-tubular section, each semi-tubular section having a cross-sectional profile generally in the form of an open semi-circular annular element, when viewed along a longitudinal axis;
   wherein each tubular conduit includes a first engagement formation located at an end of the tubular conduit, and a second engagement formation located at an opposing end of the tubular conduit;
   wherein the first engagement formation is defined by a flared female end portion;
   wherein the flared female end portion is adapted to receive the second engagement portion defined by a male projection;
   wherein each of the first and second semi-tubular sections includes a third engagement formation and a corresponding fourth engagement formation, the third engagement formation including a longitudinally extending rib, and the fourth engagement formation including a corresponding longitudinally extending groove; and
   wherein the longitudinally extending rib includes a cut-out and the longitudinally extending groove includes a corresponding tooth, the tooth and cut-out being adapted to interact to longitudinally align the first semi-tubular section and the second semi-tubular section.

2. The ventilation apparatus of claim 1, wherein the groove includes at least one outwardly tapering lip, the lip providing a lateral guide surface which assists when bringing two of the semi-tubular sections into abutment.

3. The ventilation apparatus of claim 1, wherein the first and a second semi-tubular sections are held in abutment with each other using one or more straps.

4. The ventilation apparatus of claim 1, wherein the conduit sections are fabricated from fire resistant anti-static polyethylene or polycarbonate.

5. The ventilation apparatus of claim 1, wherein the first semi-tubular section and the second semi-tubular section each include one or more hooks for securing the tubular conduit sections to a roof or wall structure.

6. A method of installing a ventilation apparatus, the method including the following steps:
   securing a first semi-tubular section to a support structure,
   securing a second semi-tubular section to the first semi-tubular section to define a tubular conduit section, the tubular conduit section having a first engagement formation located at a first end of the tubular conduit section, and a second engagement formation located at an opposing second end of the tubular conduit section;
   wherein the first semi-tubular section and the second tubular section each have a cross-sectional profile that is generally in the form of an open semi-circular annular element, when viewed along a longitudinal axis; wherein the first engagement formation is defined by a flared female end portion; wherein the flared female end portion is adapted to receive the second engagement portion defined by a male projection; wherein each of the first and second semi-tubular sections includes a third engagement formation and a corresponding fourth engagement formation, the third engagement formation including a longitudinally extending rib, and the fourth engagement formation including a corresponding longitudinally extending groove; and wherein the longitudinally extending rib includes a cut-out and the longitudinally extending groove includes a corresponding tooth, the tooth and cut-out being adapted to interact to longitudinally align the first semi-tubular section and the second semi-tubular section; and installing one or more additional tubular conduit sections such that the first engagement formation of each tubular conduit section engages with the second engagement formation of an adjacent tubular conduit section.

7. The method of claim 6, wherein the step of securing the second semi-tubular section to the first semi-tubular section includes encircling both the first and second semi-tubular sections with one or more straps, and tightening the strap(s) until the first and second semi-tubular sections are drawn into abutment.

8. The method of claim 7, wherein each of the first and second semi-tubular sections has two longitudinally extending generally parallel edges, one of the edges having the third engagement formation defined by the longitudinally extending rib, the other edge having the fourth engagement formation defined the longitudinally extending groove, wherein the step of securing the second semi-tubular section to the first semi-tubular section includes engaging the respective third engagement formations of the first semi-tubular section with the fourth engagement formation of the second semi-tubular section.

* * * * *